United States Patent
Cresswell et al.

[15] 3,671,564
[45] June 20, 1972

[54] BENZYLIDENE CYANO-ACETALS

[72] Inventors: Ronald Morton Cresswell, Scarsdale; John William Mentha, Hartsdale, both of N.Y.

[73] Assignee: Burroughs Wellcome Co., Research Triangle Park, N.C.

[22] Filed: June 12, 1969

[21] Appl. No.: 832,830

Related U.S. Application Data

[63] Continuation-in-part of Ser. No. 587,392, Oct. 18, 1966, Pat. No. 3,573,185.

[30] Foreign Application Priority Data

Oct. 28, 1965 Great Britain......................45,657/65

[52] U.S. Cl..................260/465 F, 260/256.4, 260/465.6, 260/999
[51] Int. Cl......................................C07c 121/74
[58] Field of Search................................260/465 F

[56] References Cited

UNITED STATES PATENTS 3,341,541  9/1967  Hoffer..................260/465 X
2,755,298  7/1956  Whittaker..................260/465

Primary Examiner—Joseph Rebold
Assistant Examiner—Dolph H. Torrence
Attorney—Dike, Thompson and Bronstein, Sewall P. Bronstein and Donald Brown

[57] ABSTRACT

Unsaturated acetals of the formula

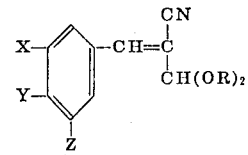

where X, Y and Z are hydrogen, halogen or lower alkoxy and R is lower alkyl. The unsaturated acetals are useful as intermediate to prepare the corresponding saturated acetals which may then be reacted with guanidine to produce the corresponding 2,4-diamino-5-benzyl pyrimidines which are useful as antibacterials.

8 Claims, No Drawings

BENZYLIDENE CYANO-ACETALS

This application is a continuation-in-part of United States patent application Ser. No. 587,392, filed Oct. 18, 1966, now U.S. Pat. No. 3,513,185.

This invention relates to novel unsaturated acetals, their production and their use as intermediates in synthesis of other useful compounds.

In particular, the present invention relates to new unsaturated acetals of the general formula IV

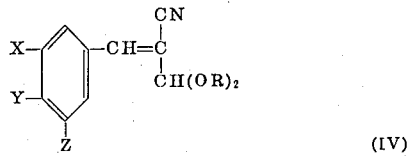

(IV)

where X, Y and Z are lower alkoxy having 1–4 carbon atoms (preferably methoxy but also including ethoxy, propoxy and butoxy), hydrogen, or halogen (bromine, chlorine, fluorine or iodine) and where R is lower alkyl preferably having one to four carbon atoms (i.e. methyl, ethyl, propyl or butyl).

The compounds of formula IV may then be converted as disclosed herein to the corresponding saturated acetals of formula I (see below) which are in turn useful when reacted with guanidine as set forth below to produce the pyrimidine compounds corresponding 2,4-diamino-5-benzyl pyrimidine compounds of formula VI which are useful in their own right as antibacterials.

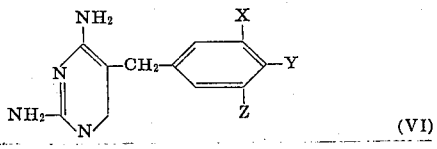

(VI)

The present invention also in particular provides benzyl cyano-acetals of the general formula I, wherein Ar is a phenyl group optionally substituted with one or more of the substituents alkoxy, alkyl, halogen, and R is an alkyl group, preferably methyl or ethyl. In the above, the alkoxy and alkyl groups have from one to four carbon atoms.

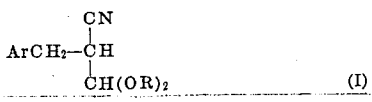

(I)

The compounds of Formula I are of value because, when reacted with guanidine they are converted to 2,4-diamino-5-benzylpyrimidines which have notable anti-bacterial properties. Further, this method of preparing 2,4-diamino-5-benzyl-pyrimidines gives superior yields to those obtained by the previously preferred route which is described in U.S. Pat. No. 3,049,544.

The acetals of Formula II are of particular interest wherein R is defined as above, R' as an alkyl group, X and Y are alkoxy, halogen or hydrogen, and the alkoxy and alkyl groups have from one to four carbon atoms. This narrower group within the scope of Formula I is preferred because of the very high activity of the derived pyrimidines of Formula III (e.g., IIIa: X= OCH$_3$; R' = CH$_3$, Y = H. IIIb:X = Y = OCH$_3$; R' = CH$_3$).

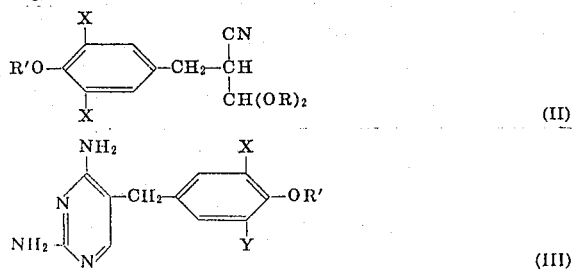

(II)

(III)

The compounds of Formula I are prepared by the following sequence:

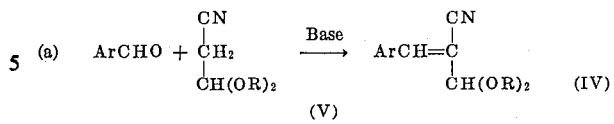

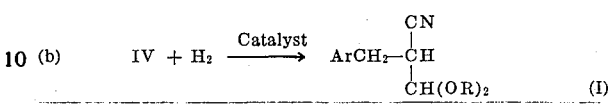

Alkoxides having from one to four carbon atoms are convenient and satisfactory for use as the base in step (a). Compound V, one of the starting materials of step (a), is conveniently prepared by the base-catalyzed addition of the elements of ROH to β-ethoxyacrylonitrile or to cyanoacetylene. Since this step is conveniently run in methanol or ethanol, R becomes the radical of the solvent alcohol. Further, since (RO)$_2$ is eliminated in the final reaction of I with guanidine, the exact identity of R is of little consequence. However, methyl acetals are more readily crystallized than the higher members and, on this ground, they are most advantageous.

The step (a) is conveniently conducted in a lower alcohol as solvent and, preferably, that alcohol is R'OH (since some exchange of R'O with solvent alcohol may take place). Since in R'OH the principal base present will be R'O, the reaction takes place under the influence of that substance, regardless of the actual source of the alkali. Thus, alkali could be introduced as NaH or NaNH$_2$, but in methanol as solvent, NaOCH$_3$ would be predominant after addition. Similarly, potassium metal could be dissolved in methanol to give a solution of KOCH$_3$. R and R' are preferably lower alkyls having from one to four carbon atoms. The compounds V can be introduced as such, or they may be produced by the addition of the elements of solvent alcohol to β-ethoxy acrylonitrile (in which process exchange of alkoxyl groups also occurs).

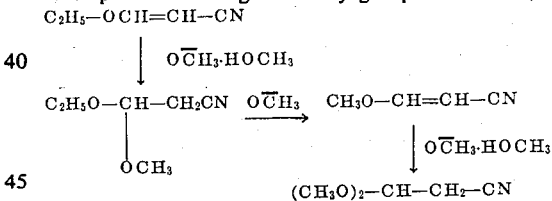

The hydrogenation step (b) is conveniently carried out using a lower alcohol (e.g., methanol or ethanol) as solvent and employing a supported catalyst. Commercial palladized charcoal is satisfactory, as is platinized charcoal if suitably prepared. (See Baltzly, J. Amer. Chem. Soc., Vol. 74, p. 4586 (1952)).

According to the present invention therefor, there are provided acetals of Formula I or Formula II, as hereinbefore defined.

According to the present invention in another aspect, there is provided a process for preparing acetals of Formula I or Formula II, which comprises the catalytic hydrogenation of an unsaturated acetal of the novel intermediate of Formula IV.

In another aspect, the present invention provides a process for preparing unsaturated acetals of Formula IV, which comprises the reaction of an aldehyde Ar CHO with a β, β-dialkoxypropionitrile of Formula V under alkaline conditions.

According to the present invention in a further aspect, there is provided a process for preparing benzylpyrimidines by reacting an acetal of Formula I or Formula II with guanidine.

The following examples illustrate the invention.

EXAMPLE I

α-veratrylidene-β,β-dimethoxy propionitrile

Sixteen g (0.3 mole) of sodium methoxide was dissolved to a clear solution in 100 ml. of methanol. The solution was cooled and 11 g. (0.11 mole) of β-ethoxyacrylonitrile was added slowly with stirring. The solution was stirred at 40° C.

for one-half hour and 16.6 g. (0.1 mole) of veratric aldehyde was then added. The aldehyde dissolved rapidly and the reaction mixture was stirred sixteen hours (over night) at 40°-45° C. The methanol was then evaporated in vacuo and the residue was partitioned between ether and water, the aqueous layer being re-extracted with ether. The combined ethereal layers were washed with water, sodium bisulphite solution and again with water, and dried over magnesium sulphate. After filtration from the desiccant and evaporation of the solvent there remained a light yellow oil weighing 24 g. (0.9 moles).

EXAMPLE 2

α-veratryl-β,β-dimethoxy propionitrile

Twenty-one g. (0.8 moles) of the product from Example 1 was dissolved in a Parr Hydrogenator with 150 ml. of absolute ethanol and 2 g of 5 percent palladized charcoal was added. After evacuation of the reducing chamber and admission of hydrogen, the reaction mixture was warmed to about 50° C. during reduction by means of an infrared lamp. After absorption of hydrogen had stopped, the catalyst was removed and the solvent evaporated in vacuo leaving 21 g. of a light-colored oil. This material does not readily crystallize, but is free of aliphatic unsaturation and is pure enough for synthetic purposes.

EXAMPLE 3

2,4-diamino-5-(3′,4′-dimethoxy benzyl)pyrimidine

In two 175 ml. portions of absolute ethanol, were dissolved separately 62 g. of guanidine hydrochloride and 37 g. of sodium methoxide. The clear solutions were combined, cooled and filtered from the precipitated sodium chloride. To the resultant solution of guanidine in ethanol was added 59.5 g. of α-(3,4-dimethoxy benzyl[ = veratryl])-β,β-dimethoxypropionitrile, prepared as in Example 2. The whole was refluxed sixteen hours on a steam bath and then concentrated to half-volume in vacuo and chilled in an ice-bath. The precipitated solid weighed 36 g. after filtration and washing with acetone followed by hexane. It was substantially pure 2,4-diamino-5-(veratryl)pyrimidine. By further concentration of the filtrate 4.5 g. more was obtained.

EXAMPLE 4

α-(3,4,5-trimethoxybenzylidene)-β,β-dimethoxypropionitrile

This experiment was conducted exactly after the pattern of Example 1, except that 19.6 g. (0.1 mole) of 3,4,5-trimethoxybenzaldehyde was used in place of veratric aldehyde. The product was a light yellow oil weighing 27 g. (.09 moles) which solidified on standing. It can be recrystallized from aqueous methanol and then melts at 64°—66° C.

EXAMPLE 5

α-(3,4,5-trimethoxybenxyl)-β,β-dimethoxypropionitrile

The product of Example 4 was hydrogenated by the method of Example 2. After reduction, the saturated product crystallized, m.p. 65.5°—66.5° C. (best M.P. 68° C).

EXAMPLE 6

2,4-diamino-5-(3′,4′,5′-trimethoxybenzyl)pyrimidine

This reaction was run exactly as described in Example 3, except 10 g. of the crystalline product of Example 5 was used and the guanidine solution was prepared from 10 g. of guanidine hydrochloride and 7 g. of sodium methoxide, each in 30 ml. of absolute ethanol. The pyrimidine product weighed 8 g. and melted at 196°—198° C.

EXAMPLE 7

α-(3,4,5-trimethoxybenzylidene)-β,β-dimethoxypropionitrile

In another experiment conducted in the identical fashion of Example 4, 100 (.51 mole) of trimethoxy benzalde-hyde, 80 g. of sodium methylate, 56 g. of β-ethoxyacrylonitrile, and 0.5 liter of methanol were used. The product weighed 137 g. (.46—.47 moles).

EXAMPLE 8

α-[5-bromo-3,4-dimethoxybenzylidene]β,β-dimethoxypropionitrile

Sixteen grams of sodium methoxide was dissolved in 100 ml. of methanol. The solution was cooled to 40° C. and 11 g. of β-ethoxyacrylonitrile was added. The temperature was maintained at 40° with stirring for one-half hour and 24.5 g. of 5-bromo-3,4-dimethoxybenzaldehyde was then added. After stirring at 40° C. for sixteen hours (over night) the solvent was removed in vacuo and the residue was partitioned between ether and water. The ethereal layer was washed twice with saturated sodium bisulfite solution and again twice with water and dried over magnesium sulphate. After charcoaling and evaporation of the ether the oily residue weighed 26.5g.

EXAMPLE 9

2,4-diamino-5-[5′-bromo-3,4-dimethoxybenzyl]pyrimidine

Five grams of the unsaturated nitrile from Example 7 was hydrogenated by the method of Example 2 and the oily product (5grams) was reacted with guanidine (from 6 g. of guanidine hydrochloride and 4 g. of sodium methoxide in 60 ml. of abs. ethanol) as described in Example 3. The product after crystallization from alcohol melted at 200°—203.5° and showed no depression of melting point when mixed with an authentic sample.

EXAMPLE 10

α-[p-chlorobenzylidene]-β,β-dimethoxypropionitrile

Fourteen grams (0.1 mole) of p-chlorobenzaldehyde was condensed with the reaction mixture from 11 g. of β-ethoxyacrylonitrile and 16 g. of sodium methoxide in 100 ml. of methanol as described in Example 1. The oily product weighed 20 g.

EXAMPLE 11

2,4-diamino-5-[p-chlorobenzyl]-pyrimidine

The unsaturated nitrile above was hydrogenated by the method of Example 2 and the oily product was reacted with guanidine as described in Example 3. The product melted at 215°—216° and at 216°—217° when mixed with an authentic sample.

What is claimed:

1. The compound of the formula

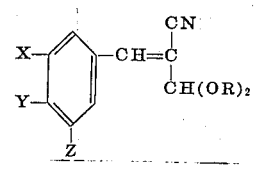

where X, Y and Z are lower alkoxy having 1 to 4 carbon atoms, halogen or hydrogen and R is lower alkyl.

2. The compound of claim 1 where X, Y and Z are methoxyl.

3. The compound of claim 2 where R is methyl.

4. The compound of claim 1 where X and Y are methoxyl and Z is hydrogen.

5. The compound of claim 4 where R is methyl.

6. α-veratrylidene-β,β-dimethoxypropionitrile.
7. α-(3,4,5-trimethoxybenzylidene)-β,β-dimethoxypropionitrile.
8. α-[5-bromo-3,4-dimethoxybenzylidene]-β,β-dimethoxypropionitrile.

* * * * *